United States Patent
Suzuki et al.

(10) Patent No.: US 7,595,975 B2
(45) Date of Patent: Sep. 29, 2009

(54) DIELECTRIC CERAMIC, CERAMIC ELECTRONIC ELEMENT, AND MULTILAYER CERAMIC CAPACITOR

(75) Inventors: Shoichiro Suzuki, Yasu (JP); Hideaki Niimi, Hikone (JP)

(73) Assignee: Murata Manufacturing Co., Ltd. (JP)

( * ) Notice: Subject to any disclaimer, the term of this patent is extended or adjusted under 35 U.S.C. 154(b) by 0 days.

(21) Appl. No.: 12/340,929

(22) Filed: Dec. 22, 2008

(65) Prior Publication Data

US 2009/0128989 A1 May 21, 2009

Related U.S. Application Data

(63) Continuation of application No. PCT/JP2007/061287, filed on Jun. 4, 2007.

(30) Foreign Application Priority Data

Jul. 7, 2006 (JP) ............... 2006-187509

(51) Int. Cl.
*H01G 4/06* (2006.01)

(52) U.S. Cl. ............... 361/321.4; 361/321.1; 361/321.5; 361/311; 361/312; 361/306.1; 501/135; 501/136; 501/138; 501/139

(58) Field of Classification Search ............... 361/321.4, 361/301.1, 301.4, 303–305, 311–313, 306.1, 361/306.3, 321.1, 321.2, 321.5; 501/134, 501/136–139
See application file for complete search history.

(56) References Cited

U.S. PATENT DOCUMENTS

| | | | | |
|---|---|---|---|---|
| 6,310,761 B1 * | 10/2001 | Hori et al. | ................ | 361/321.2 |
| 6,556,423 B2 * | 4/2003 | Konaka et al. | ........... | 361/321.2 |
| 6,620,754 B2 * | 9/2003 | Mizuno et al. | ............... | 501/138 |
| 6,620,755 B2 * | 9/2003 | Saito et al. | ................... | 501/138 |
| 7,160,827 B2 * | 1/2007 | Banno | ........................ | 501/138 |
| 7,172,985 B2 * | 2/2007 | Pinceloup et al. | ........... | 501/135 |
| 7,312,172 B2 * | 12/2007 | Sasaki et al. | ................ | 501/136 |
| 7,397,649 B2 * | 7/2008 | Muto et al. | ............... | 361/321.4 |

FOREIGN PATENT DOCUMENTS

| | | |
|---|---|---|
| JP | 58-143511 | 8/1983 |
| JP | 59-182273 A | 10/1984 |
| JP | 3-40962 | 2/1991 |
| JP | 2001-097772 A | 4/2001 |

(Continued)

OTHER PUBLICATIONS

PCT/JP2007/061287 Written Opinion dated Jun. 14, 2007.
Ceramic Engineering For Dielectrics, Third Edition, Jun. 10, 1983, K. Okazaki.

*Primary Examiner*—Nguyen T Ha
(74) *Attorney, Agent, or Firm*—Dickstein, Shapiro, LLP.

(57) ABSTRACT

A dielectric ceramic including a perovskite compound represented by the general formula $\{(Ba_{1-x-y}Ca_xSn_y)_m(Ti_{1-z}Zr_z)O_3\}$ as a primary component in which the x, y, z, and m satisfy $0.02 \leq x \leq 0.20$, $0.02 \leq y \leq 0.20$, $0 \leq z \leq 0.05$, and $0.99 \leq m \leq 1.1$ and is processed by a thermal treatment at a low oxygen partial pressure of $1.0 \times 10^{-10}$ to $1.0 \times 10^{-12}$ MPa. Accordingly, there are provided a dielectric ceramic which can be stably used in a high-temperature atmosphere without degrading dielectric properties, properties of which can be easily adjusted, and which generates no electrode breakage even when ceramic layers and conductive films are co-fired, and a ceramic electronic element, such as a multilayer ceramic capacitor, which uses the above dielectric ceramic.

12 Claims, 1 Drawing Sheet

FOREIGN PATENT DOCUMENTS

| | | |
|---|---|---|
| JP | 2003-146660 | 5/2003 |
| JP | 2004-353072 | 12/2004 |
| JP | 2005-259393 | 9/2005 |
| WO | WO-2005-075377 | 8/2005 |

\* cited by examiner

DIELECTRIC CERAMIC, CERAMIC ELECTRONIC ELEMENT, AND MULTILAYER CERAMIC CAPACITOR

CROSS REFERENCE TO RELATED APPLICATIONS

The present application is a continuation of International Application No. PCT/JP2007/061287, filed Jun. 4, 2007, which claims priority to Japanese Patent Application No. JP2006-187509, filed Jul. 7, 2006, the entire contents of each of these applications being incorporated herein by reference in their entirety.

FIELD OF THE INVENTION

The present invention relates to a dielectric ceramic, a ceramic electronic element, and a multilayer ceramic capacitor, and more particularly relates to a dielectric ceramic which is suitably used in a high-temperature atmosphere, a ceramic electronic element using the dielectric ceramic, and a multilayer ceramic capacitor.

BACKGROUND OF THE INVENTION

In recent years, various ceramic electronic elements, such as a multilayer ceramic capacitor, have been widely mounted on various electronic devices, such as an automobile electronic control device.

As an electronic material used for this type of ceramic electronic element, a dielectric ceramic material primarily composed of barium titanate ($BaTiO_3$) has been well known, and research and development therefor has been actively performed.

For example, in Patent Document 1, a dielectric ceramic composition has been proposed which contains BaO, $TiO_2$, $SnO_2$, $Bi_2O_3$, MgQ, and $SiO_2$ in a predetermined composition range as an essential primary component and at least one of $La_2O_3$, $Sm_2O_3$, and $Nd_2O_3$ in a predetermined range as a selective essential component.

In this Patent Document 1, by controlling the composition of the essential primary components and the selective essential components in a predetermined range, a dielectric ceramic composition is obtained which has a relative dielectric constant $\epsilon r$ of 1,000 or more and a dielectric loss tan δ of 10% or less and which is suitably used for a so-called delay line.

In addition, in Patent Document 2, a dielectric ceramic composition has been proposed which is primarily composed of a perovskite compound represented by a composition formula $(Ba_{1-x}Sn_x)_mTiO_3$ in which $0.01 \leq x \leq 0.3$ and $0.9 \leq m \leq 1.1$ hold, and in which a Ba site represented by the $(Ba_{1-x}Sn_x)$ substantially includes no Sr.

In this Patent Document 2, Ba of $BaTiO_3$ is partly replaced with Sn in a predetermined molar range, and the molar ratio of the Ba site to the Ti site is controlled in a predetermined molar range, so that a lead-free dielectric ceramic composition is obtained which has a Curie temperature Tc of 130° C. or more, a remanent polarization of approximately 20 $\mu C/cm^2$ or more, and a high relative dielectric constant $\epsilon r$ of 700 or more.

In general, since Sn in the form of a quadrivalent cation maintains its stable state, it is believed that in a $BaTiO_3$-based compound, Sn is usually solid-solved in the Ti site. In addition, in Non-Patent Document 1, it has been disclosed that although the Curie temperature Tc of $BaTiO_3$ is 120° C., when Ti is partly replaced with Sn, the Curie temperature Tc is significantly decreased from 120° C. to room temperature or less.

Patent Document 1: Japanese Unexamined Patent Application Publication No. 3-040962

Patent Document 2: International Publication No. WO 2005/075377 Pamphlet

Non-Patent Document 1: K. Okazaki, "Ceramic Engineering for Dielectrics", third edition, Gakken-sha Publishing Co., Ltd., June 1983, pp. 281 to 283

According to the dielectric ceramic composition disclosed in the Patent Document 1, since the Curie temperature Tc is low, such as −20 to +15° C., and the relative dielectric constant $\epsilon r$ is rapidly decreased as the temperature is increased, there has been a problem in that this dielectric ceramic composition is difficult to be practically used in a high-temperature atmosphere. In particular, since a multilayer ceramic capacitor has been widely used for automobile applications in recent years, it has been requested to be used even in a high-temperature atmosphere at approximately 150° C.

Incidentally, the reason the dielectric ceramic composition disclosed in the Patent Document 1 has a low Curie temperature of −20 to +15° C. as described above is believed that in consideration of the description in the Non-Patent Document 1, Sn is solid-solved in the Ti site.

On the other hand, according to the dielectric ceramic composition disclosed in the Patent Document 2, a high Curie temperature Tc of 130° C. or more is obtained since Sn is solid-solved in the Ba site.

However, in the Patent Document 2, since an oxygen partial pressure in firing is extremely low, such as $10^{-12}$ to $10^{16}$ MPa, the degree of freedom of firing conditions is limited, and as a result, there has been a problem in that properties of a ceramic electronic element are difficult to be adjusted. In addition, for example, due to the change in firing temperature, the insulation properties of a dielectric ceramic may be degraded in some cases. Furthermore, when this dielectric ceramic composition is used for a multilayer ceramic capacitor, as the thickness of internal electrodes is decreased, a conductive material is sphered when ceramic layers and conductive films to be formed into the internal electrodes are co-fired, and as a result, so-called electrode breakage may disadvantageously occur in some cases.

That is, although quadrivalent Sn generally maintains a stable state, in order to solid-solve Sn in the Ba site, quadrivalent Sn must be formed into divalent Sn. Hence, in the Patent Document 2, a firing treatment is performed in a reducing atmosphere in which the oxygen partial pressure is extremely decreased to $10^{-12}$ to $10^{-16}$ MPa. However, on the other hand, since the oxygen partial pressure in firing is extremely low as described above, the degree of freedom of firing conditions is limited, the insulating properties of the dielectric ceramic are degraded, for example, by the change in firing temperature, and furthermore electrode breakage of the internal electrode may disadvantageously occur in some cases.

SUMMARY OF THE INVENTION

The present invention has been conceived in consideration of the above situation, and on object of the present invention is to provide a dielectric ceramic which can be stably used in a high-temperature atmosphere without degrading dielectric properties, properties of which can be easily adjusted, and which generates no electrode breakage even when a ceramic layer and a conductive film are co-fired; a ceramic electronic element using this dielectric ceramic; and a multilayer ceramic capacitor.

In a BaTiO$_3$-based compound, when Sn is solid-solved in the Ba site, the Curie temperature Tc can be increased. However, in order to solid-solve Sn in the B site by reducing stable quadrivalent Sn to divalent Sn, when the oxygen partial pressure in firing is extremely decreased to $10^{-12}$ to $10^{-16}$ MPa, various problems as described above occur.

Hence, through intensive research carried out by the inventors of the present invention, it was found that when Ca is contained in the composition, this Ca facilitates solid solution of Sn in the Ba site. As a result, it was found that without performing a firing treatment at an extremely low oxygen partial pressure of $10^{-12}$ to $10^{-16}$ MPa, a dielectric ceramic having a high Curie temperature Tc can be obtained. In addition, in order to smoothly reduce quadrivalent Sn to divalent Sn, it is believed that thermal treatment including not only firing but also calcining is preferably performed in a predetermined low oxygen partial pressure range.

The present invention was made based on the findings as described above and provides a dielectric ceramic including a perovskite compound represented by the general formula $\{(Ba_{1-x-y}Ca_xSn_y)_m(Ti_{1-z}Zr_z)O_3\}$ as a primary component, and in this formula, the x, y, z, and m satisfy $0.02 \leq x \leq 0.20$, $0.02 \leq y \leq 0.20$, $0 \leq z \leq 0.05$, and $0.99 \leq m \leq 1.1$.

In addition, the dielectric ceramic of the present invention preferably has a Curie temperature of 130° C. or more.

Furthermore, in the dielectric ceramic of the present invention, at least one component of Mn and V may be contained in 0.02 to 2 molar parts with respect to 100 molar parts of the primary component.

In addition, in the dielectric ceramic of the present invention, Si may be contained in 0.02 to 5 molar parts with respect to 100 molar parts of the primary component.

In addition, in a ceramic electronic element of the present invention, a ceramic base body formed from the above dielectric ceramic includes a conductor.

Furthermore, a multilayer ceramic capacitor of the present invention has a ceramic base body having ceramic layers and internal electrodes alternately laminated to each other, and external electrodes which are provided at two end portions of the ceramic base body and which are connected to the internal electrodes, and in the above multilayer ceramic capacitor, the ceramic layers are formed from the dielectric ceramic described above.

According to the dielectric ceramic of the present invention, since Ca facilitates solid solution of Sn in the Ba site, without performing a thermal treatment at an extremely low oxygen partial atmosphere, a dielectric ceramic having a high Curie temperature can be obtained. In addition, as a result, a dielectric ceramic can be obtained which has stable dielectric properties even in a high-temperature atmosphere, properties of which can be easily adjusted since the degree of freedom of firing conditions is increased, and which can prevent degradation in insulating properties.

In addition, since the Curie temperature is 130° C. or more, a dielectric ceramic can be obtained which is suitably used, for example, for automobile applications in which stable properties are required in a high-temperature atmosphere at approximately 150° C.

In addition, since at least one of Mn and V in 0.02 to 2 molar parts is contained with respect to 100 molar parts of the primary component, or Si in 0.02 to 5 molar parts is contained with respect to 100 molar parts of the primary component, sintering properties can be improved.

In addition, according to the ceramic electronic element of the present invention, since the ceramic base body formed from the above dielectric ceramic includes a conductor, a ceramic electronic element can be realized which can be stably used in a high-temperature atmosphere, which can also easily change its dielectric properties by adjusting firing conditions, and which can prevent degradation in insulating properties, for example, due to the change in firing temperature.

In addition, according to the multilayer ceramic capacitor of the present invention, since the ceramic layers are formed from the above dielectric ceramic, firing can be performed in a firing atmosphere at an oxygen partial pressure of approximately $10^{-10}$ to $10^{-12}$ MPa, so that besides the above-described effects, even when the thickness of internal electrodes is decreased, failures, such as electrode breakage, which are caused when the internal electrodes are sphered can be suppressed. Hence, a multilayer ceramic capacitor can be realized which can be stably used in a high-temperature atmosphere and which can be suitably used for automobile applications and the like.

Figure 1:
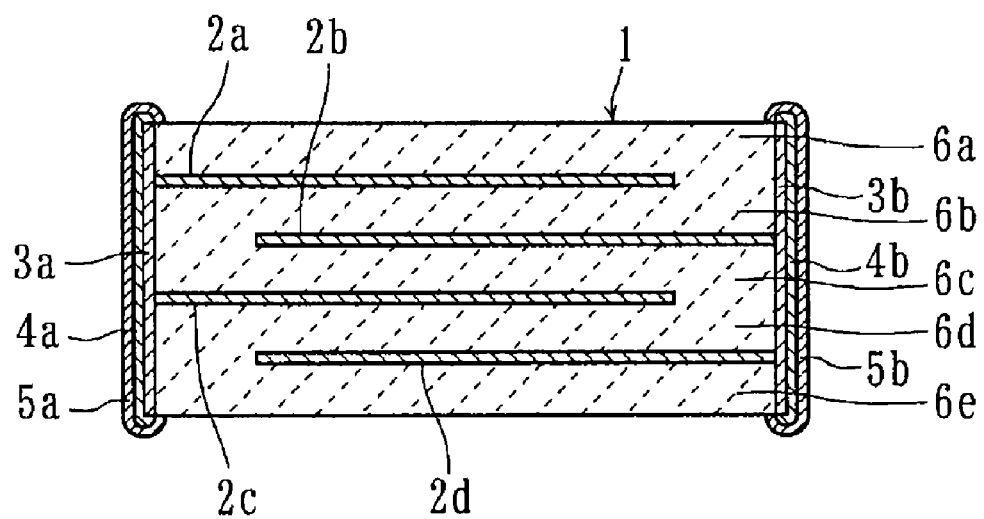
FIG. 1 is a cross-sectional view schematically showing one embodiment of a multilayer ceramic capacitor as a ceramic electronic element using a dielectric ceramic according to the present invention.

REFERENCE NUMERALS 1 ceramic base body
2a to 2d internal electrode
3a, 3b external electrode
6a to 6e ceramic layer (dielectric ceramic)

DETAILED DESCRIPTION OF THE INVENTION

Next, embodiments of the present invention will be described in detail.

A dielectric ceramic according to one embodiment of the present invention includes a perovskite compound as a primary component represented by the following general formula:

$$(Ba_{1-x-y}Ca_xSn_y)_m(Ti_{1-z}Zr_z)O_3 \quad\quad (A)$$

wherein x, y, z, and m satisfy the following equations (1) to (4).

$$0.02 \leq x \leq 0.20 \quad\quad (1)$$

$$0.02 \leq y \leq 0.20 \quad\quad (2)$$

$$0 \leq z \leq 0.05 \quad\quad (3), \text{and}$$

$$0.99 \leq m \leq 1.1 \quad\quad (4).$$

That is, in the dielectric ceramic of this embodiment, the primary component is formed of a BaTiO$_3$-based compound having a perovskite structure, and Ba of the Ba site is partly replaced with Sn and Ca in a predetermined molar range.

When Sn in the form of a divalent cation is solid-solved in the Ba site as described above, the Curie temperature can be increased to a high temperature of 130° C. or more, and as a result, a dielectric ceramic which can be stably used in a high-temperature atmosphere at approximately 150° C. can be obtained.

Furthermore, when Ba is partly replaced with Ca, although the firing atmosphere is not set at an extremely low oxygen partial pressure (such as $1.0 \times 10^{-12}$ to $1.0 \times 10^{-16}$ MPa), a desired dielectric ceramic can be obtained.

Hereinafter, the reasons the above x, y, z, and m are set in the ranges represented by the equations (1) to (4) will be described in detail.

(1) x

When Ca is contained in the $BaTiO_3$ compound as described above, solid solution of Sn in the Ba site can be facilitated. For example, by firing at a low oxygen partial pressure of approximately $1.0 \times 10^{-10}$ to $1.0 \times 10^{-12}$ MPa, Sn can be solid-solved in the Ba site.

However, when the molar ratio x of Ca in the Ba site is less than 0.02, the molar content of Ca is excessively small, and as a result, solid solution of Sn in the Ba site cannot be sufficiently facilitated. On the other hand, when the molar ratio x is more than 0.20, since sintering properties may be degraded in some cases, it is not preferable.

Accordingly, in this embodiment, composition components are adjusted so that the molar ratio x satisfies $0.02 \leq x \leq 0.20$.

(2) y

Although the Curie temperature Tc of $BaTiO_3$ is 120° C. (Non-Patent Document 1), when Sn is solid-solved in the Ba site, the Curie temperature Tc can be increased to 130° C. or more.

However, when the molar ratio y of Sn in the Ba site is less than 0.02, since the molar content of Sn is excessively small, an effect of increasing the Curie temperature Tc cannot be expected. On the other hand, when the molar ratio y is more than 0.20, although the Curie temperature Tc is increased, the relative dielectric constant $\epsilon r$ tends to decrease, and the dielectric loss tan δ also increases.

Accordingly, in this embodiment, the composition components are adjusted so that the molar ratio y satisfies $0.02 \leq y \leq 0.20$.

(3) z

In the dielectric ceramic of this embodiment, whenever necessary, Ti may be partly replaced with Zr.

However, when the molar ratio z of Zr in the Ti site is more than 0.05, the Curie temperature Tc is significantly decreased, and a dielectric ceramic which can be stably used in a high-temperature atmosphere cannot be obtained.

Accordingly, in this embodiment, the composition components are adjusted so that the molar ratio z satisfies $0 \leq z \leq 0.05$.

(4) m

Although the molar ratio m of the Ba site to the Ti site is 1.00 in a stoichiometric composition, whenever necessary, the stoichiometric composition is preferably shifted.

However, when the molar ratio m is shifted to less than 0.99 or more than 1.1 from the stoichiometric composition, the sintering properties may be degraded in some cases.

Accordingly, in this embodiment, the composition components are adjusted so that the molar ratio m satisfies $0.99 \leq m \leq 1.1$.

As for the form of Ca present in the dielectric ceramic, Ca is solid-solved in the Ba site as described above; however, since Ca hardly influences an increase and a decrease in Curie temperature Tc, as long as other various properties are not adversely influenced, Ca may be present in crystalline boundaries or at a crystalline triple point, or it may also be solid-solved in the Ti site.

In addition, in order to improve sintering properties, at least one of Mn and V is preferably added to the primary component. In this case, in order to obtain an effect of improving the sintering properties, 0.02 molar parts or more is preferably added to 100 molar parts of the primary component. However, when more than 2 molar parts is added to 100 molar parts of the primary component, the dielectric properties tend to degrade. Hence, when at least one of Mn and V is added, the content thereof is preferably set in the range of 0.02 to 2 molar parts with respect to 100 molar parts of the primary component.

In addition, by the same reason as described above, it is preferable that 0.02 to 5 molar parts of Si be contained with respect to 100 molar parts of the primary component.

According to the present invention, the Curie point is preferably 130° C. or more. In the dielectric ceramic of the present invention, since Sn is contained as the primary component, when it is confirmed that the Curie temperature is 130° C. or more, the presence of Sn in the Ba site is indirectly verified. As disclosed in the Non-Patent Document 1, the reason for this is that when Sn is present in the Ti site, the Curie temperature is significantly decreased from 120° C.

In addition, since the Ba site of the dielectric ceramic of the present invention is partly replaced with Sn, a high Curie temperature can be advantageously obtained; however, a large amount of a component decreasing the Curie temperature is not preferably contained. In the case in which a component decreasing the Curie temperature is added, for example, the amount of Sn partly replacing the Ba site is preferably increased.

On the contrary, as an element increasing the Curie temperature of barium titanate as well as Sn, for example, Pb or Bi may be mentioned. However, Pb and B are environmental burden materials and have very poor reduction resistance, and hence the above elements are very difficult to be used in a multilayer ceramic capacitor. Accordingly, in the dielectric ceramic of the present invention, when it is confirmed that the Curie temperature is 135° C. or more, the presence of Sn in the form of a divalent cation in the Ba site is substantially verified.

FIG. 1 is a cross-sectional view showing one embodiment of a multilayer ceramic capacitor using the dielectric ceramic described above.

In the above multilayer ceramic capacitor, internal electrodes 2a to 2d are buried in a ceramic base body 1, external electrodes 3a and 3b are formed on two end surfaces of the ceramic base body 1, and first plating films 4a and 4b and second plating films 5a and 5b are formed so as to cover the external electrodes 3a and 3b, respectively.

That is, the ceramic base body 1 is formed such that the internal electrodes 2a to 2d and the ceramic layers 6a to 6e formed from the dielectric ceramic of the present invention are alternately laminated to each other and fired, the internal electrodes 2a and 2c are electrically connected to the external electrode 3a, and the internal electrodes 2b and 2d are electrically connected to the external electrode 3b. In addition, electrostatic capacity is formed between facing surfaces of the internal electrodes 2a and 2c and the internal electrodes 2b and 2d.

Next, a method for manufacturing the above multilayer ceramic capacitor will be described in detail.

First, as ceramic raw materials, a Ba compound such as $BaCO_3$, a Ti compound such as $TiO_2$, a Ca compound such as $CaCO_3$, and a Sn compound such as $SnO_2$ are prepared, and in addition, whenever necessary, a Zr compound such as $ZrO_2$ may also be prepared.

Next, the above ceramic raw materials are weighed so that the above general formula (A) satisfies the above equations (1) to (4).

Subsequently, after the materials thus weighed are charged in a ball mill with pure water and cobbles such as PSZ (Partially Stabilized Zirconia) balls and are sufficiently mixed and pulverized by a wet process, a calcining treatment (thermal treatment) at a temperature of approximately 1,000° C. or more is performed, so that a powdered primary component is formed. In this step, since quadrivalent Sn must be reduced to divalent Sn, as a calcining atmosphere, a reducing atmosphere containing a $N_2$—$H_2$ mixed gas at an oxygen partial pressure of $1.0\times10^{-10}$ to $1.0\times10^{-12}$ MPa is preferably used.

Subsequently, after an Mn compound such as MnO, a V compound such as $V_2O_5$, and a Si compound such as $SiO_2$ are prepared as accessory component materials, these accessory component materials and the above powdered primary component are mixed in a ball mill, followed by evaporative drying, so that a powdered ceramic starting material is obtained. In this embodiment, since the addition of the accessory component materials is optionally performed, when they are not added, the step described above is omitted.

Next, the powdered ceramic starting material is charged in a ball mill together with an organic binder and an organic solvent and is mixed by a wet process, so that a ceramic slurry is formed. Subsequently, this ceramic slurry is processed by a doctor blade method or the like to form ceramic green sheets.

Then, by using an internal-electrode conductive paste, screen printing is performed on ceramic green sheets, so that conductive films each having a predetermined pattern are formed on surfaces of the ceramic green sheets.

In addition, as a conductive material contained in the internal-electrode conductive paste, in order to reduce the cost, Ni, Cu, Ag, or an alloy thereof is preferably used.

Next, after the ceramic green sheets on which the conductive films are formed are laminated to each other in a predetermined direction, a laminate thus formed is sandwiched with ceramic green sheets which are not provided with the conductive films and is then pressure-bonded to each other, and the laminate thus pressure-bonded is then cut into a predetermined dimension, so that a ceramic laminate is formed. Subsequently, a de-binder treatment is performed at a temperature of approximately 300 to 500° C., and a firing treatment (thermal treatment) is further performed at a temperature of 1,000 to 1,200° C. for approximately 2 hours in a reducing atmosphere containing a $H_2$—$N_2$—$H_2O$ mixed gas in which the oxygen partial pressure is controlled in the range of approximately $1.0\times10^{-10}$ to $1.0\times10^{-12}$ MPa. As a result, the conductive films and the ceramic green sheets are co-fired, and the ceramic base body 1 in which the internal electrodes 2a to 2d and the ceramic layers 6a to 6e are alternately laminated to each other is obtained.

Next, an external-electrode conductive paste is applied to the two end surfaces of the ceramic base body 1, followed by performing a firing treatment, so that the external electrodes 3a and 3b are formed.

In addition, as the external-electrode conductive paste, a paste in which glass frit is added to a conductive material is preferably used. In addition, as the conductive material, in order to reduce the cost, Ni, Cu, Ag, or an alloy thereof may be used, and whenever necessary, for example, Pd or Ag—Pd may also be used.

In addition, as a method for forming the external electrodes 3a and 3b, after the external-electrode conductive paste is applied to the two end surfaces of the ceramic laminate, it may be processed by a firing treatment together with the ceramic laminate.

Next, after the first plating films 4a and 4b composed, for example, of Ni, Cu, or a Ni—Cu alloy are formed on the surfaces of the external electrodes 3a and 3b by electroplating, the second plating films 5a and 5b composed, for example, of solder or tin are formed on the first plating films 4a and 4b by electroplating in order to obtain more superior soldering properties, so that a multilayer ceramic capacitor is manufactured.

The present invention is not limited to the embodiment described above. Although a desired primary component powder is obtained in calcining synthesis in the above embodiment, after the molar ratio m of the Ba site to the Ti site is set in advance to be smaller that a predetermined value, and a calcining treatment is performed, at least one deficient component may be optionally added so as to form a desired primary component powder. In this case, the component which is added as a deficient component is primarily solid-solved in the Ba site by firing, and hence a desired m value can be satisfactorily obtained.

In addition, in the above embodiment, the multilayer ceramic capacitor is described as one example of the ceramic electronic element; however, of course, it is to be understood that the present invention can be applied to other ceramic electronic elements, such as a single layer ceramic capacitor.

Next, examples of the present invention will be described in detail.

EXAMPLE 1

First, as ceramic raw materials, $BaCO_3$, $TiO_2$, $CaCo_3$, and $SnO_2$ were prepared. Next, these ceramic raw materials were weighed so that primary components had the compositions as shown in Table 1. Subsequently, the materials thus weighed were charged to a ball mill with PSZ balls and pure water and were sufficiently mixed and pulverized by a wet process, followed by drying, so that a mixed powder was obtained.

Next, after this mixed powder was calcined by a thermal treatment performed at a temperature of 1,000° C. for 2 hours in a reducing atmosphere containing a $N_2$—$H_2$ mixed gas in which the oxygen partial pressure was controlled to be $1.0\times10^{-10.0}$ MPa, dry pulverization was performed, so that a powdered ceramic starting material having a primary composition represented by $(Ba_{1-x-y}Ca_xSn_y)_mTiO_3$ was formed.

Next, after a poly(vinyl butyral)-based binder and ethanol functioning as a solvent were added to this powdered ceramic starting material, mixing and pulverizing were performed, so that a ceramic slurry was obtained. The ceramic slurry thus obtained was then processed by a doctor blade method, so that ceramic green sheets were obtained.

Subsequently, a conductive paste primarily composed of Ni was applied to surfaces of ceramic green sheets by screen printing to form conductive films. Next, the ceramic green sheets on which the above conductive films were formed were laminated to each other in a predetermined direction and were then sandwiched by ceramic green sheets on which no conductive films were formed, followed by pressure bonding, so that a ceramic laminate was formed.

Next, heating of this ceramic laminate was performed in a nitrogen atmosphere at a temperature of 350° C. so as to remove the binder by burning, and a firing treatment (thermal treatment) was then performed at a temperature of 1,200° C. for 2 hours in a reducing atmosphere containing a $H_2$—$N_2$—$H_2O$ gas in which the oxygen partial pressure was controlled as shown in Table 1, thereby obtaining a ceramic base body (ceramic sintered body).

Next, a conductive paste primarily composed of Cu and containing B—Li—Si—Ba—O-based glass frit was applied to two end surfaces of this ceramic base body and was processed by a firing treatment at a temperature of 600° C. in a nitrogen atmosphere, so that external electrodes electrically connected to the internal electrodes were formed.

In addition, electroplating was finally performed to form a Ni film and a Sn film on the surface of each of the external electrodes, thereby forming multilayer ceramic capacitors of sample Nos. 1 to 6.

The external dimensions of each of the multilayer ceramic capacitors were 2.0 mm long, 1.0 mm wide, and 0.5 mm thick. In addition, the thickness of the ceramic layer interposed between the internal electrodes was 5 μm, the thickness of the internal electrode was 0.5 μm, the effective number of layers for obtaining electrostatic capacitance was 5, and the counter electrode area per one ceramic layer was 1.3 mm².

Next, the relative dielectric constant εr, the dielectric loss tan δ, and the Curie temperature Tc of the sample Nos. 1 to 6 were measured.

That is, by using an automatic bridge measurement device, electrostatic capacitance C and the dielectric loss tan δ were measured at a frequency of 1 kHz, an effective voltage of 0.2 Vrms, and a temperature of 25° C., and the relative dielectric constant εr was calculated from the electrostatic capacitance C.

In addition, the change in electrostatic capacitance with temperature was measured in the range of −55 to +200° C., and a temperature at which the electrostatic capacitance was maximized was regarded as the Curie temperature.

In addition, the cross-sections of the sample Nos. 1 to 6 were observed by a scanning electron microscope, and it was investigated whether the internal electrode was sphered or not.

Table 1 shows the composition components of the sample Nos. 1 to 6 and the measurement results thereof.

performed at an oxygen partial pressure of $1.0 \times 10^{-10.0}$ to $1.0 \times 10^{-11.5}$ MPa, Sn was mostly solid-solved in the Ba site.

EXAMPLE 2

As ceramic raw materials, $BaCO_3$, $TiO_2$, $CaCO_3$, and $SnO_2$ were prepared as in the example 1. Next, these ceramic raw materials were weighed so that primary components had the compositions as shown in Table 2. Subsequently, the materials thus weighed were charged to a ball mill with PSZ balls and pure water and were sufficiently mixed and pulverized by a wet process, followed by drying, so that a mixed powder was obtained.

Next, this mixed powder was calcined by a thermal treatment performed at a temperature of 1,000° C. for 2 hours in a reducing atmosphere containing a $N_2$—$H_2$ mixed gas in which the oxygen partial pressure was controlled as shown in Table 2, and dry pulverization was then performed, so that a powdered ceramic starting material having a primary composition represented by $(Ba_{1-x-y}Ca_xSn_y)_mTiO_3$ was formed.

Next, after an acrylic-based organic binder and ethanol functioning as a solvent were added to this powdered ceramic starting material, wet mixing was performed, followed by drying and pelletizing. Subsequently, the pelletized product was press-molded by applying a pressure of 196 MPa, so that a disc-shaped ceramic molded body having a diameter of 12 mm and a thickness of 1 mm was obtained.

TABLE 1

| Sample No. | $(Ba_{1-x-y}Ca_xSn_y)_mTiO_3$ | | | Oxygen partial pressure (MPa) | | Relative dielectric constant εr | Dielectric loss tan δ (%) | Curie temperature Tc (° C.) | Presence of sphered internal electrode |
|---|---|---|---|---|---|---|---|---|---|
| | x | y | m | In calcining | In firing | | | | |
| 1* | 0.00 | 0.05 | 1.00 | $1.0 \times 10^{-10.0}$ | $1.0 \times 10^{-10.0}$ | 1,000 | 3.0 | 90 | No |
| 2* | 0.00 | 0.05 | 1.00 | $1.0 \times 10^{-10.0}$ | $1.0 \times 10^{-13.0}$ | 1,800 | 5.0 | 145 | Yes |
| 3 | 0.02 | 0.05 | 1.00 | $1.0 \times 10^{-10.0}$ | $1.0 \times 10^{-10.0}$ | 1,700 | 3.0 | 145 | No |
| 4 | 0.02 | 0.05 | 1.00 | $1.0 \times 10^{-10.0}$ | $1.0 \times 10^{-11.5}$ | 1,700 | 2.0 | 145 | No |
| 5 | 0.04 | 0.05 | 1.00 | $1.0 \times 10^{-10.0}$ | $1.0 \times 10^{-10.0}$ | 1,600 | 2.0 | 145 | No |
| 6 | 0.04 | 0.05 | 1.00 | $1.0 \times 10^{-10.0}$ | $1.0 \times 10^{-11.5}$ | 1,600 | 2.0 | 145 | No |

*Out of the range of the present invention.

According to the sample No. 1, the molar ratio x was 0.00, and the Curie temperature Tc was decreased to 90° C. The reason for this is believed that although Sn was used so as to obtain a molar ratio y of 0.05, since Ca was not contained, Sn was mostly solid-solved in the Ti site at an oxygen partial pressure of $1.0 \times 10^{-10.0}$ MPa in firing.

Although the sample No. 2 had a high Curie temperature of 145° C., Ni (conductive material) forming the internal electrodes was sphered. That is, although Ca was not contained in the dielectric ceramic, since the oxygen partial pressure in firing was extremely decreased to $1.0 \times 10^{-13.0}$ MPa, Sn was solid-solved in the Ba site, and as a result, the Curie temperature Tc was increased. However, on the other hand, since the oxygen partial pressure was extremely low as described above, Ni was unfavorably sphered.

On the other hand, according to the sample Nos. 3 to 6, since the molar ratio x was 0.02 to 0.04 and Ca in the range of the present invention was contained in the dielectric ceramic, even at an oxygen partial pressure of approximately $1.0 \times 10^{-10.0}$ to $1.0 \times 10^{-11.5}$ MPa, the internal electrodes were not unfavorably sphered, and a high Curie temperature Tc of 145° C. could be obtained. The reason for this is believed that since Ca was contained in the composition, solid solution of Sn in the Ba site was facilitated, and as a result, even when firing was Next, this ceramic molded body was processed by heating in a nitrogen atmosphere at a temperature of 350° C. to remove the binder by burning, and a firing treatment was then performed at a temperature of 1,200° C. for 2 hours in a reducing atmosphere containing a $H_2$—$N_2$—$H_2O$ gas in which the oxygen partial pressure in firing was controlled as shown in Table 2, thereby obtaining a ceramic base body (ceramic sintered body).

Next, by using a vacuum deposition method, external electrodes primarily composed of Ag were formed on two primary surfaces of the ceramic base body, so that single layer ceramic capacitors of sample Nos. 11 to 19 were formed.

The external dimensions of these single layer ceramic capacitors were 10 mm in diameter and 0.8 mm in thickness.

Next, the relative dielectric constant εr, the dielectric loss tan δ, and the Curie temperature Tc of each of the samples 11 to 19 were measured by similar methods to those in the example 1.

In addition, by using an x-ray diffraction apparatus, x-ray diffraction measurement was performed on the surface of the ceramic base body, and the axial ratio c/a of the perovskite crystalline structure at room temperature was obtained.

Table 2 shows the composition components of the sample Nos. 11 to 19 and the measurement results thereof.

TABLE 2

| Sample No. | $(Ba_{1-x-y}Ca_xSn_y)_mTiO_3$ | | | Oxygen partial pressure (MPa) | | Relative dielectric constant εr | Dielectric loss tan δ (%) | Curie temperature Tc (° C.) | Axial Ratio c/a |
|---|---|---|---|---|---|---|---|---|---|
| | x | y | m | In calcining | In firing | | | | |
| 11* | 0.13 | 0.00 | 1.00 | In the air | In the air | 2,000 | 2.0 | 120 | 1.008 |
| 12* | 0.13 | 0.02 | 1.00 | In the air | In the air | 1,800 | 2.0 | 105 | 1.004 |
| 13* | 0.13 | 0.02 | 1.00 | In the air | $1.0 \times 10^{-11.5}$ | 1,800 | 2.0 | 105 | 1.004 |
| 14 | 0.13 | 0.02 | 1.00 | $1.0 \times 10^{-10.0}$ | $1.0 \times 10^{-11.5}$ | 1,300 | 3.0 | 130 | 1.011 |
| 15 | 0.13 | 0.05 | 1.00 | $1.0 \times 10^{-10.0}$ | $1.0 \times 10^{-11.5}$ | 1,200 | 3.0 | 150 | 1.011 |
| 16 | 0.13 | 0.10 | 1.00 | $1.0 \times 10^{-10.0}$ | $1.0 \times 10^{-11.5}$ | 1,100 | 3.0 | 165 | 1.012 |
| 17 | 0.13 | 0.15 | 1.00 | $1.0 \times 10^{-10.0}$ | $1.0 \times 10^{-11.5}$ | 1,100 | 5.0 | 175 | 1.013 |
| 18 | 0.13 | 0.20 | 1.00 | $1.0 \times 10^{-10.0}$ | $1.0 \times 10^{-11.5}$ | 1,000 | 8.0 | 185 | 1.015 |
| 19* | 0.13 | 0.30 | 1.00 | $1.0 \times 10^{-10.0}$ | $1.0 \times 10^{-11.5}$ | 700 | 15.0 | 200 | 1.018 |

*Out of the range of the present invention

Since the sample No. 11 was calcined and fired in the air and also contained no Sn, the Curie temperature Tc was 120° C. that was approximately equivalent to that of $BaTiO_3$.

Although the sample No. 12 was prepared so that the molar ratio y of Sn was 0.02, the Curie temperature Tc was low, such as 105° C. The reason for this is believed that since calcining and firing were performed in the air, Sn was not reduced and was primarily solid-solved in the Ti site, and as a result, the Curie temperature Tc was decreased lower than that of $BaTiO_3$.

Although the sample No. 13 was prepared so that the molar ratio y of Sn was 0.02, and the oxygen partial pressure in firing was decreased to $1.0 \times 10^{-11.5}$ MPa, the Curie temperature Tc was 105° C. that was approximately equivalent to that of the sample No. 12. The reason for this is believed that although the firing treatment was performed at a low oxygen partial pressure of $1.0 \times 10^{-11.5}$ MPa, since the calcining treatment was performed in the air, Sn was not sufficiently reduced and was primarily solid-solved in the Ti site, and as a result, as in the sample No. 12, the Curie temperature Tc was decreased lower than that of $BaTiO_3$.

In addition, according to the sample No. 19, since the thermal treatments in calcining and in firing were performed at a low oxygen partial pressure of $1.0 \times 10^{-10.0}$ MPa and of $1.0 \times 10^{-11.5}$ MPa, respectively, the Curie temperature Tc was increased to 200° C.; however, since the molar ratio y of Sn was 0.30, which was more than 0.20, it was understood that the dielectric properties were unfavorably degraded such that the relative dielectric constant εr was decreased to 700 and the dielectric loss tan δ was increased to 15.0%.

On the other hand, according to the sample Nos. 14 to 18, the molar content ratio x of Ca was 0.13 and the molar content ratio y of Sn was 0.02 to 0.20, both of which were in the ranges of the present invention. Accordingly, since solid solution of Sn in the Ba site was facilitated, even when the thermal treatments in calcining and in firing were performed at an appropriate low oxygen partial pressure of $1.0 \times 10^{-10.0}$ MPa and of $1.0 \times 10^{-11.5}$ MPa, respectively, the Curie temperature Tc could be increased to 130 to 185° C. without degrading the dielectric properties.

In addition, the axis ratio c/a was increased as the Curie temperature Tc was increased, and the crystalline system was changed from the cubic system to the tetragonal system. Hence, when the maximum point of the relative dielectric constant εr with the change in temperature was not clear, by measuring the axis ratio c/a, the Curie temperature Tc could be estimated.

EXAMPLE 3

By a method and a procedure similar to those of the example 1, multilayer ceramic capacitors of sample Nos. 21 to 29 were formed so that primary components had the compositions as shown in Table 3. In this example 3, thermal treatments in calcining and firing were each performed at an oxygen partial pressures of $1.0 \times 10^{-10.0}$ MPa.

Next, by methods similar to those of the example 1, the relative dielectric constant εr, the dielectric loss tan δ, and the Curie temperature Tc of each of the sample Nos. 21 to 29 were measured.

Table 3 shows the composition components of the sample Nos. 21 to 29 and the measurement results thereof.

TABLE 3

| Sample No. | $(Ba_{1-x-y}Ca_xSn_y)_mTiO_3$ | | | Oxygen partial pressure (MPa) | | Relative dielectric constant εr | Dielectric loss tan δ (%) | Curie temperature Tc (° C.) |
|---|---|---|---|---|---|---|---|---|
| | x | y | m | In calcining | In firing | | | |
| 21 | 0.08 | 0.05 | 1.00 | $1.0 \times 10^{-10.0}$ | $1.0 \times 10^{-10.0}$ | 1,600 | 3.0 | 152 |
| 22 | 0.10 | 0.05 | 1.00 | $1.0 \times 10^{-10.0}$ | $1.0 \times 10^{-10.0}$ | 1,500 | 3.3 | 150 |
| 23 | 0.15 | 0.05 | 1.00 | $1.0 \times 10^{-10.0}$ | $1.0 \times 10^{-10.0}$ | 1,200 | 3.5 | 153 |
| 24 | 0.20 | 0.05 | 1.00 | $1.0 \times 10^{-10.0}$ | $1.0 \times 10^{-10.0}$ | 1,200 | 4.0 | 151 |
| 25* | 0.21 | 0.05 | 1.00 | $1.0 \times 10^{-10.0}$ | $1.0 \times 10^{-10.0}$ | — | — | — |
| 26* | 0.10 | 0.05 | 0.98 | $1.0 \times 10^{-10.0}$ | $1.0 \times 10^{-10.0}$ | — | — | — |
| 27 | 0.10 | 0.05 | 0.99 | $1.0 \times 10^{-10.0}$ | $1.0 \times 10^{-10.0}$ | 1,500 | 3.8 | 155 |
| 28 | 0.10 | 0.05 | 1.10 | $1.0 \times 10^{-10.0}$ | $1.0 \times 10^{-10.0}$ | 1,500 | 4.7 | 155 |
| 29* | 0.10 | 0.05 | 1.15 | $1.0 \times 10^{-10.0}$ | $1.0 \times 10^{-10.0}$ | — | — | — |

*Out of the range of the present invention

Since the sample No. 25 had a molar ratio x of Ca in the Ba site of 0.21, which was more than 0.20, a sintering defect occurred, and the properties could not be measured.

Since the sample No. 26 had a ratio m of the Ba site to the Ti site of 0.98, which was less than 0.99, a sintering defect occurred as in the sample No. 25, and the properties could not be measured.

Since the sample No. 29 has a ratio m of the Ba site to the Ti site of 1.15, which was more than 1.1, a sintering defect occurred as in the sample Nos. 25 and 26, and the properties could not be measured.

On the other hand, according to the sample Nos. 21 to 24, 27, and 28, the molar ratios x, y, and m were all in the ranges of the present invention, and hence it was confirmed that a multilayer ceramic capacitor having a Curie temperature Tc of 150 to 155° C. can be obtained without degrading dielectric properties even when calcining and firing are performed at an oxygen partial pressure of $1.0 \times 10^{-10.0}$ MPa.

The invention claimed is:

1. A dielectric ceramic comprising:
a perovskite compound represented by the general formula $\{(Ba_{1-x-y}Ca_xSn_y)_m(Ti_{1-z}Zr_z)O_3\}$ as a primary component,
wherein the x, y, z, and m satisfy
$0.02 \leq x \leq 0.20$,
$0.02 \leq y \leq 0.20$,
$0 \leq z \leq 0.05$, and
$0.99 \leq m \leq 1.1$.

2. The dielectric ceramic according to claim 1, wherein the Curie temperature is 130° C. or more.

3. The dielectric ceramic according to claim 1, wherein at least one component of Mn and V is contained in 0.02 to 2 molar parts with respect to 100 molar parts of the primary component.

4. The dielectric ceramic according claim 3 wherein Si is contained in 0.02 to 5 molar parts with respect to 100 molar parts of the primary component.

5. The dielectric ceramic according to claim 1 wherein Si is contained in 0.02 to 5 molar parts with respect to 100 molar parts of the primary component.

6. The dielectric ceramic according to claim 1, wherein the Ca is solid-solved in the Ba site.

7. The dielectric ceramic according to claim 1, wherein the Ca is present in crystalline boundaries.

8. The dielectric ceramic according to claim 1, wherein the Ca is present at a crystalline triple point.

9. The dielectric ceramic according to claim 1, wherein the Ca is solid-solved in the Ti site.

10. The dielectric ceramic according to claim 1, wherein an axial ratio c/a of the perovskite compound is at least about 1.01.

11. A ceramic electronic element comprising:
a ceramic base body containing the dielectric ceramic according to claim 1; and
a conductor attached to the ceramic base body.

12. A multilayer ceramic capacitor comprising:
a ceramic base body having ceramic layers and internal electrodes alternately Laminated to each other; and
external electrodes provided at two end portions of the ceramic base body and which are electrically connected to the internal electrodes,
wherein the ceramic layers contain the dielectric ceramic according to claim 1.

* * * * *